United States Patent [19]

Clegg

[11] Patent Number: 4,628,904
[45] Date of Patent: Dec. 16, 1986

[54] SOLAR CYLINDER

[76] Inventor: John E. Clegg, 2320 Keystone Dr., Orlando, Fla. 32806

[21] Appl. No.: 282,041

[22] Filed: Jul. 10, 1981

[51] Int. Cl.⁴ .................................................. F24J 3/02
[52] U.S. Cl. ..................................... 126/417; 126/438
[58] Field of Search .............. 126/438, 439, 440, 451, 126/417; 350/359, 484, 485

Primary Examiner—Larry Jones

[57] ABSTRACT

The disclosure is a hollow glass cylinder with an aluminized interior for the reception, temporary retention and study of concentrated solar radiation. The cylinder is toroidal in shape, with an inside wall and an outside wall joined by two end walls. A concentrated beam of high intensity is directed into the cylinder through a rotary light valve, with the line of entry of the beam forming a tangent with the inner surface of the outside cylinder wall. The beam is reflected around the inner surface of the wall, with the direction of propagation at the end of each revolution being parallel to the beam being received through the light valve.

1 Claim, 4 Drawing Figures

SOLAR CYLINDER

BACKGROUND OF THE INVENTION

The invention is an optical instrument used in the study of solar radiation. There is no relevant prior art.

DESCRIPTION OF THE PREFERRED EMBODIMENT

Figure 1:
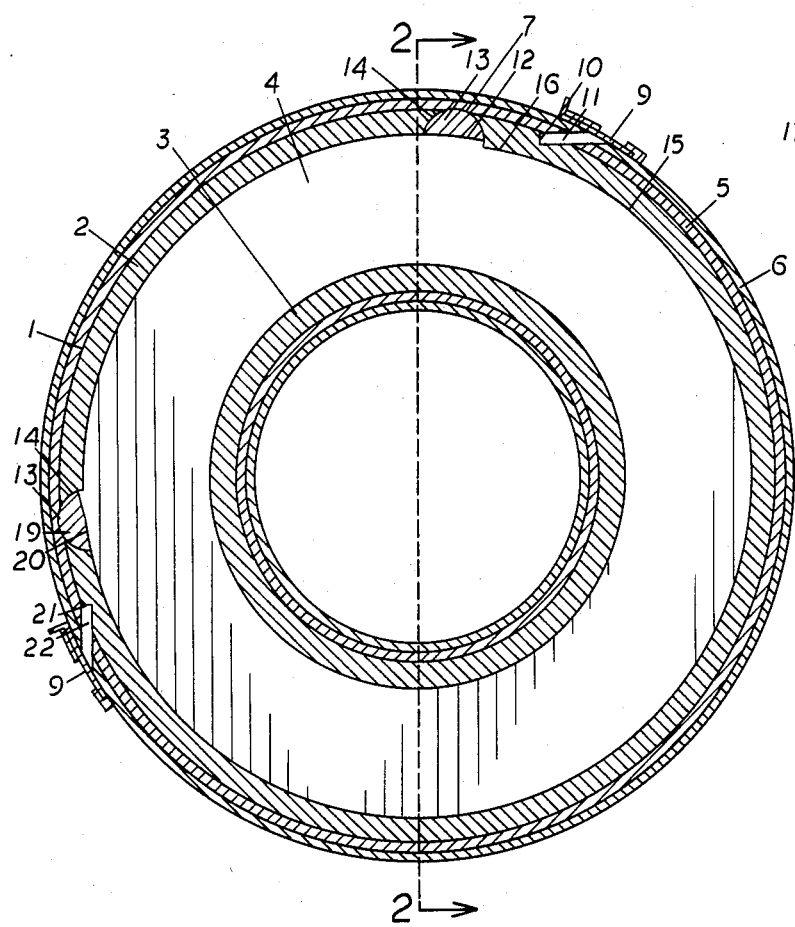
FIG. 1 is an elevation of the solar cylinder.
Figure 2:
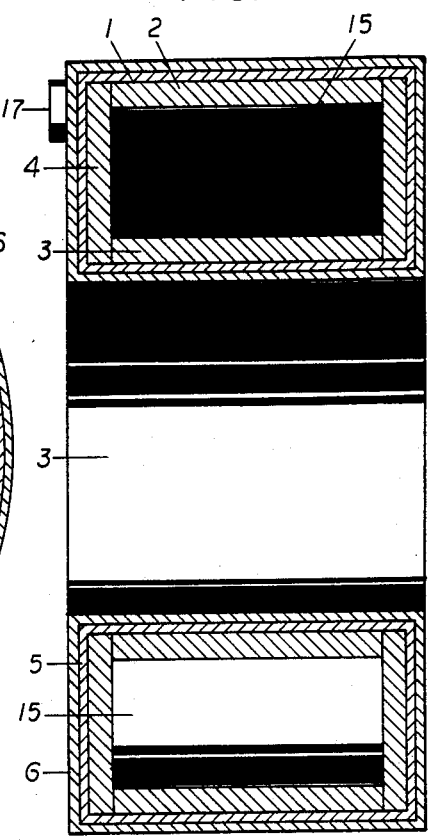
FIG. 2 is a cross section taken on line 2—2 of FIG. 1.

FIG. 1 shows toroidal glass cylinder 1 with outside wall 2, inside wall 3 and end wall 4 enclosed in felt lining 5 and metal casing 6 which reduce heat loss and protect against breakage. All interior surfaces of cylinder 1 are aluminized. FIG. 2 is a cross sectional view of cylinder 1.

Figure 3:
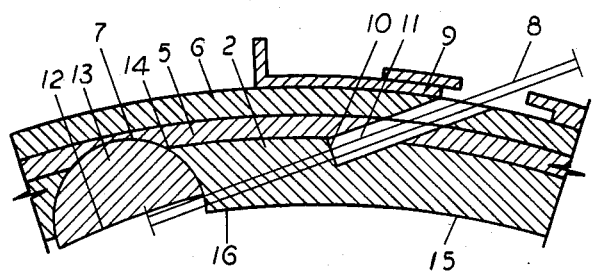
FIG. 3 is an enlarged view of the receptor light valve.

Rotary receptor light valve 7 is shown in detail in FIG. 3. Concentrated beam 8 of solar radiation from a prismatic beam concentrator (not shown) passes through casing shutter 9 and is transmitted into outside wall 2 by perpendicular end wall 10 of receptor port 11. Receptor valve 7 is a longitudinal half-rod of glass with an aluminized longitudinal face 12 extending the length of the half-rod and with a rounded cylindrical portion 13 occupying longitudinal cylindrical receptacle 14 in outside wall 2. Longitudinal face 12 has the general configuration of inner surface 15 of outside wall 2. Light ramp 16 is an inward projection of outside wall 2 which deflects the revolving circular radiation (not shown) inward and away from concentrated beam 8, creating a low-intensity area on longitudinal face 12 which permits a free and unobstructed ingress of concentrated beam 8. Receptor valve 7 extends through end wall 4 and projects outside of casing 6 as a knob 17 which permits receptor valve 7 to be opened and closed from outside cylinder 1.

Figure 4:
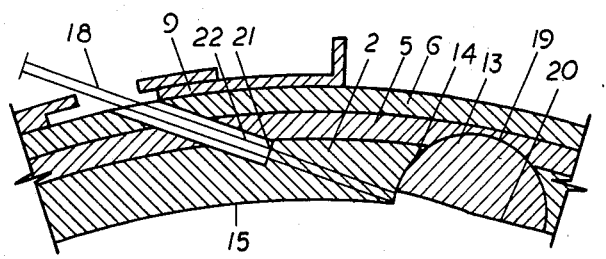
FIG. 4 is an enlarged view of the emitter light valve.

Heat beam 18 separates from revolving circular radiation and is emitted by rotary emitter light valve 19 as shown in FIG. 4. Longitudinal face 20 of emitter valve 19 is angular and when closed it forms an indentation with inner surface 15 of outside wall 2, as shown in FIG. 1. When emitter valve 19 is open the indented portion of longitudinal face 20 is flush with inner surface 15, as shown in FIG. 4. This design prevents longitudinal face 20 from being rotated inside the circle of revolution formed by inner surface 15 and obstructing the revolution of the circulating solar radiation.

Heat beam 18 passes through outside wall 2 to perpendicular end wall 21 of emitter port 22 and exits through casing shutter 9. The knob by which emitter valve 19 is opened and closed is not shown.

I claim:

1. A solar retention cylinder comprising in general a cylindrical glass chamber for the reception, temporary retention, and emission of the radiation of concentrated solar beams produced by prismatic beam concentrators, and comprising in particular;

a hollow glass cylinder (1) of toroidal shape having an outside cylindrical wall (2), an inside cylindrical wall (3), and two parallel circular end walls (4) occupying basal cylindrical planes, said outside wall, said inside wall and said end walls defining a toroidal retention chamber, said toroidal chamber having interior surfaces which are aluminized to reflect light, a receptor port (11) comprising a thin elongate rectangular cavity disposed at an angle in said outside wall, said receptor port serving as entry means of said concentrated solar beam into said toroidal chamber, said receptor port terminating in an end wall (10) which is perpendicular to said concentrated solar beam so as to transmit said beam into said outside wall without refraction, a rotary receptor light valve (7) located in said outside wall in the line of projection of said concentrated solar beam, said light valve comprising an elongate half-rod of glass having a rounded cylindrical portion (13) and an opposed elongate face (12) extending the length of said half-rod, said rounded portion being mounted inside said outside wall in an elongate cylindrical receptacle (14) so as to revolve therein as means of emitting said concentrated solar beam into said toroidal chamber or as means of intercepting said concentrated solar beam, a rotary emitter light valve (19) located in said outside wall, said light valve comprising an elongate half-rod of glass having a rounded cylindrical portion (13) and an opposed elongate face (12) extending the length of said half-rod, said rounded portion being mounted inside said outside wall in an elongate cylindrical receptacle (14) so as to revolve therein as means of emitting a concentrated beam from said toroidal chamber, an emitter port (22) comprising a thin elongate rectangular cavity disposed at an angle in said outside wall in the line of projection of said concentrated beam emitted by said light valve, said emitter port serving as means of exit of said concentrated beam from said light valve, said emitter port terminating in an end wall (21) which is perpendicular to said concentrated beam so as to transmit said beam out of said outside wall without refraction.

* * * * *